United States Patent [19]

Gerber

[11] Patent Number: 4,841,822
[45] Date of Patent: Jun. 27, 1989

[54] CUTTER HEAD AND KNIFE FOR CUTTING SHEET MATERIAL

[75] Inventor: Heinz J. Gerber, West Hartford, Conn.

[73] Assignee: Gerber Scientific, Inc., South Windsor, Conn.

[21] Appl. No.: 861,148

[22] Filed: May 8, 1986

[51] Int. Cl.[4] ............................ B26D 7/12; B26D 5/00
[52] U.S. Cl. ........................................ 83/174; 83/747;
83/761; 83/628; 83/697; 83/925 CC
[58] Field of Search ................. 83/925 CC, 628, 761,
83/174, 74, 747, 756, 758, 697, 174.1, 561, 639,
917, 389, 49

[56] References Cited

U.S. PATENT DOCUMENTS

| | | | |
|---|---|---|---|
| 2,534,001 | 12/1950 | Couse | 83/751 |
| 3,548,699 | 12/1970 | Gerber | 83/528 |
| 3,955,458 | 5/1976 | Pearl | 83/528 |
| 4,033,214 | 7/1977 | Pearl | 83/528 |
| 4,133,235 | 1/1979 | Gerber | 83/925 CC |
| 4,667,553 | 5/1987 | Gerber et al. | 83/925 CC |

*Primary Examiner*—Donald R. Schran
*Attorney, Agent, or Firm*—McCormick, Paulding & Huber

[57] ABSTRACT

A cutting head for cutting spread sheet material and using a vertically reciprocating knife achieves a lightweight, low cost, low maintenance and high stroking speed design through a unique combination and arrangement of parts wherein the knife drive motor is isolated from rotation with the knife about the theta axis without using a conventional swivel mechanism. The knife has a leaf spring portion directly connected to the eccentric member, fatigue failure of the leaf spring portion of the blade is inhibited by antivibration stops and by a varying cross-section, a simple sharpener mechanism sharpens the blade on either one or both side faces, and a roller guide restrains the lower portion of the blade to the vertical axis with minimum frictional loss.

40 Claims, 7 Drawing Sheets

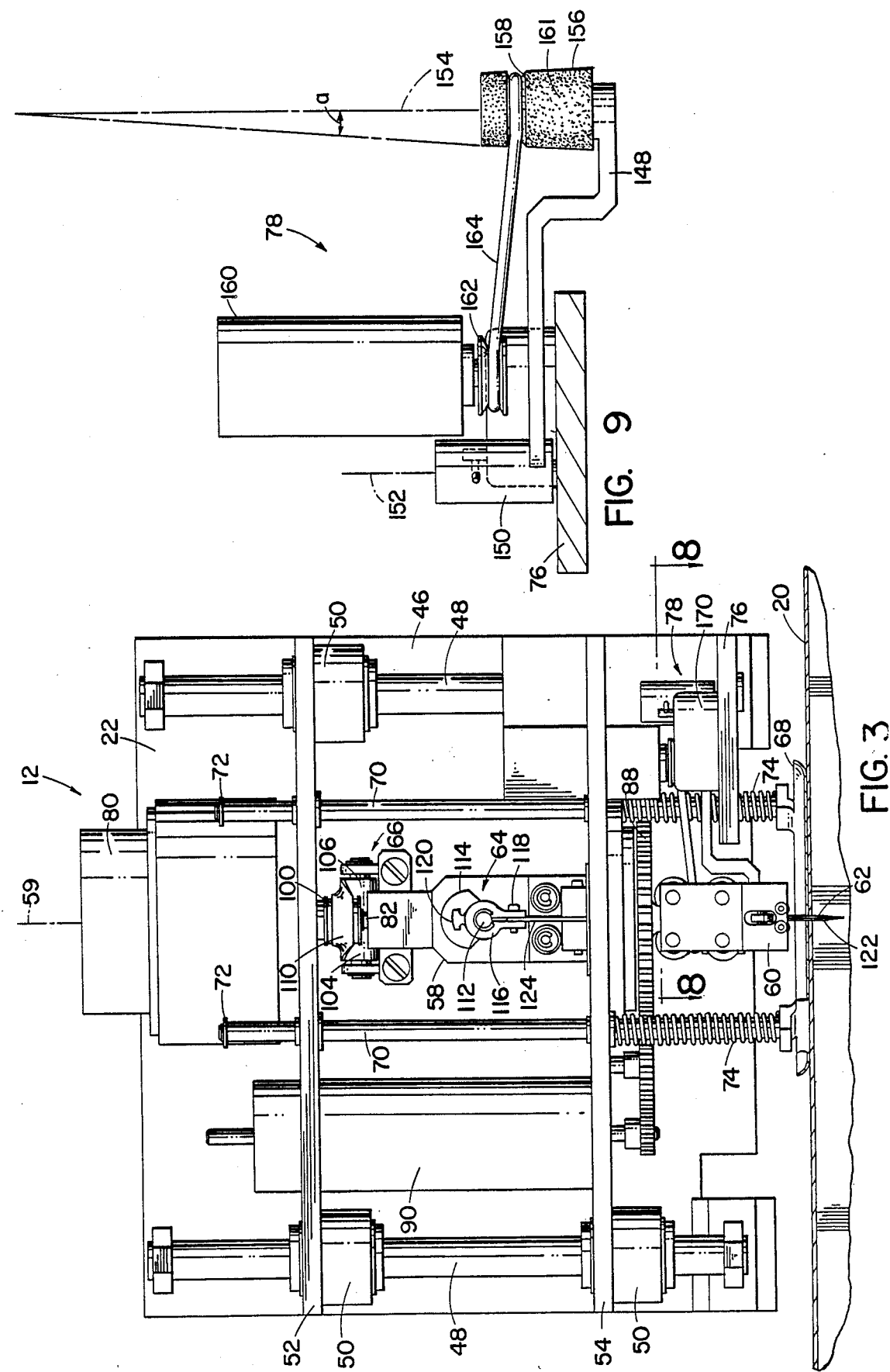

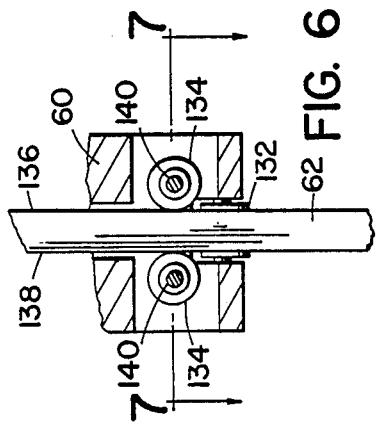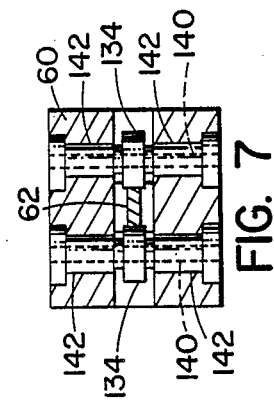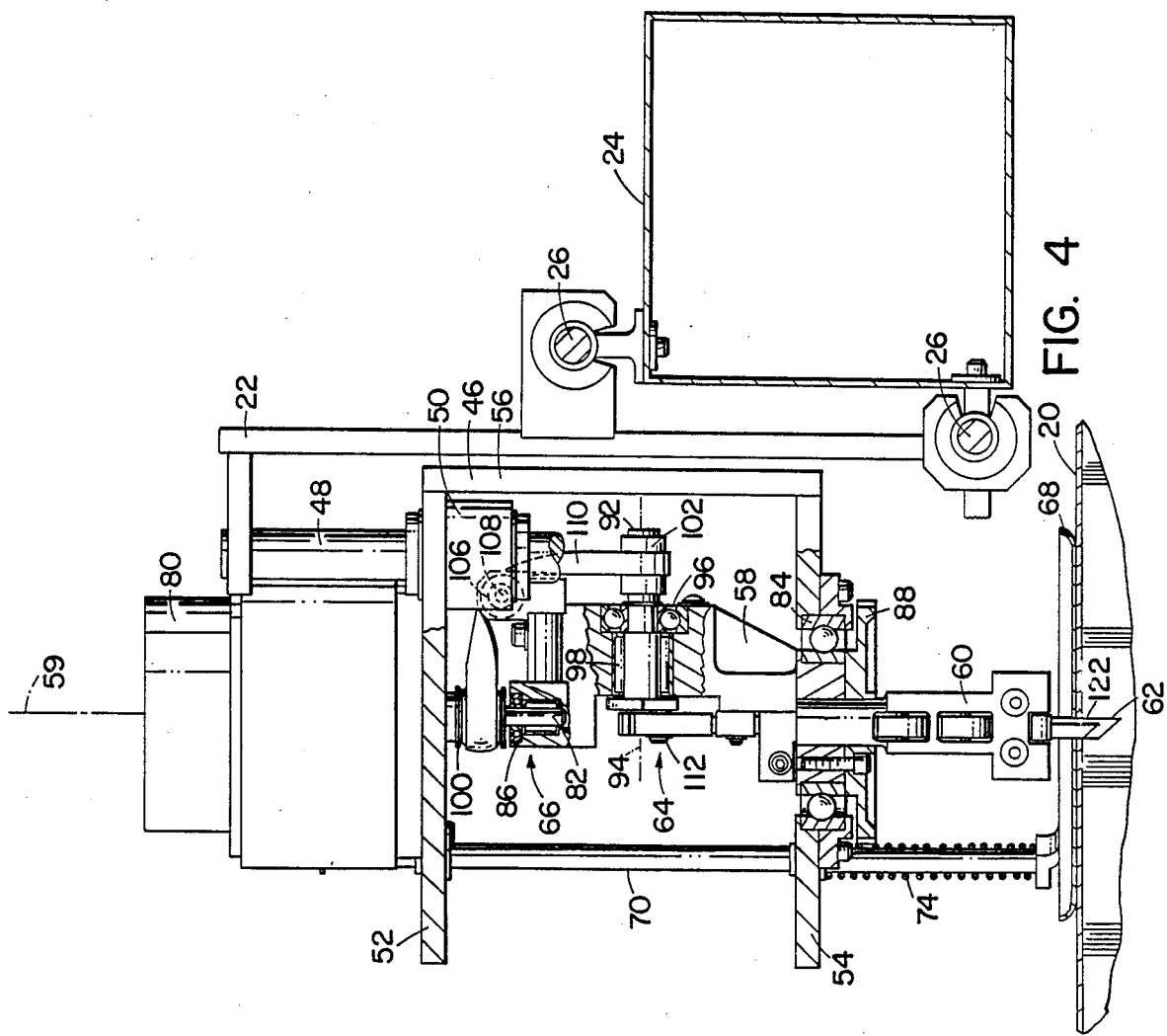

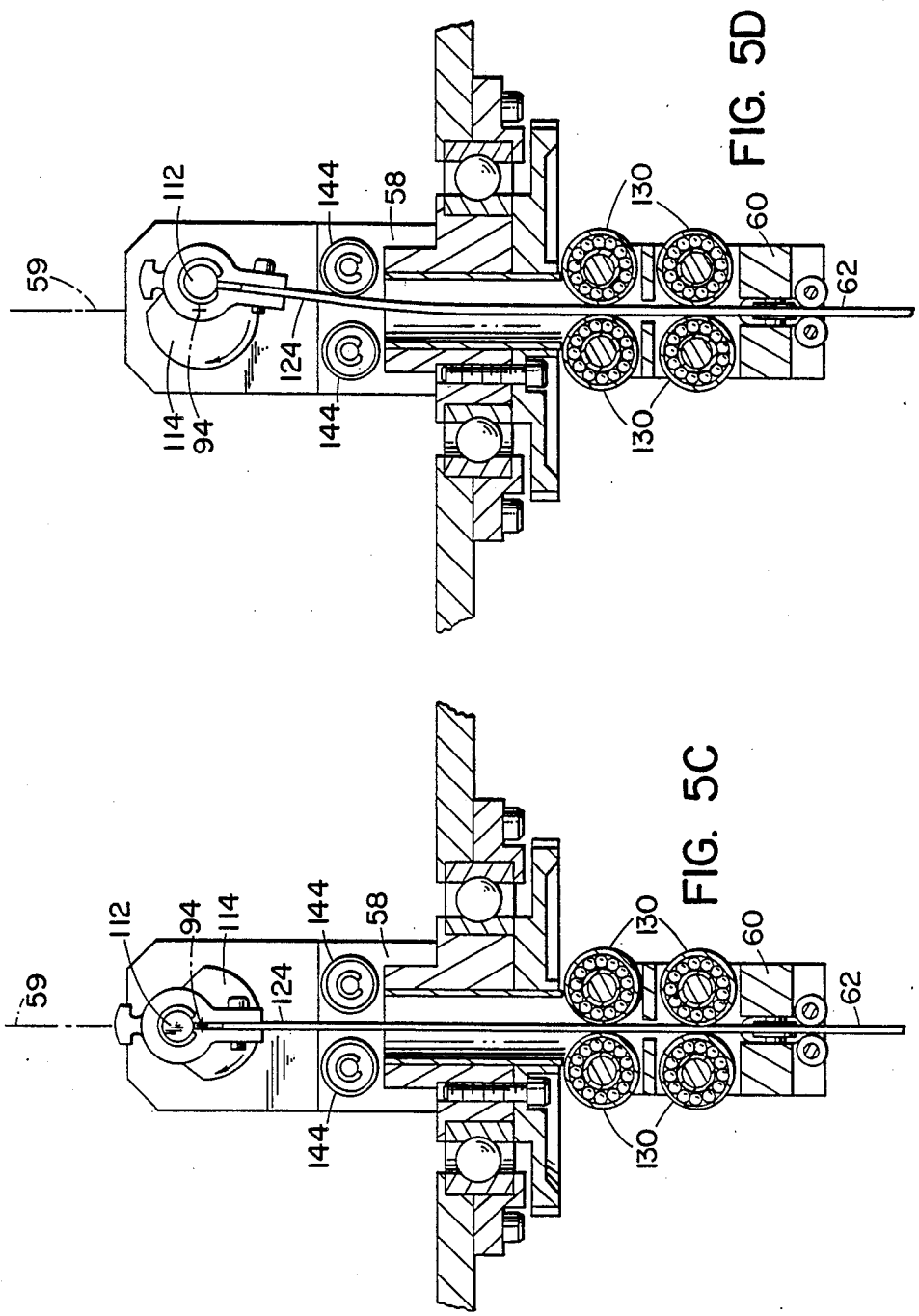

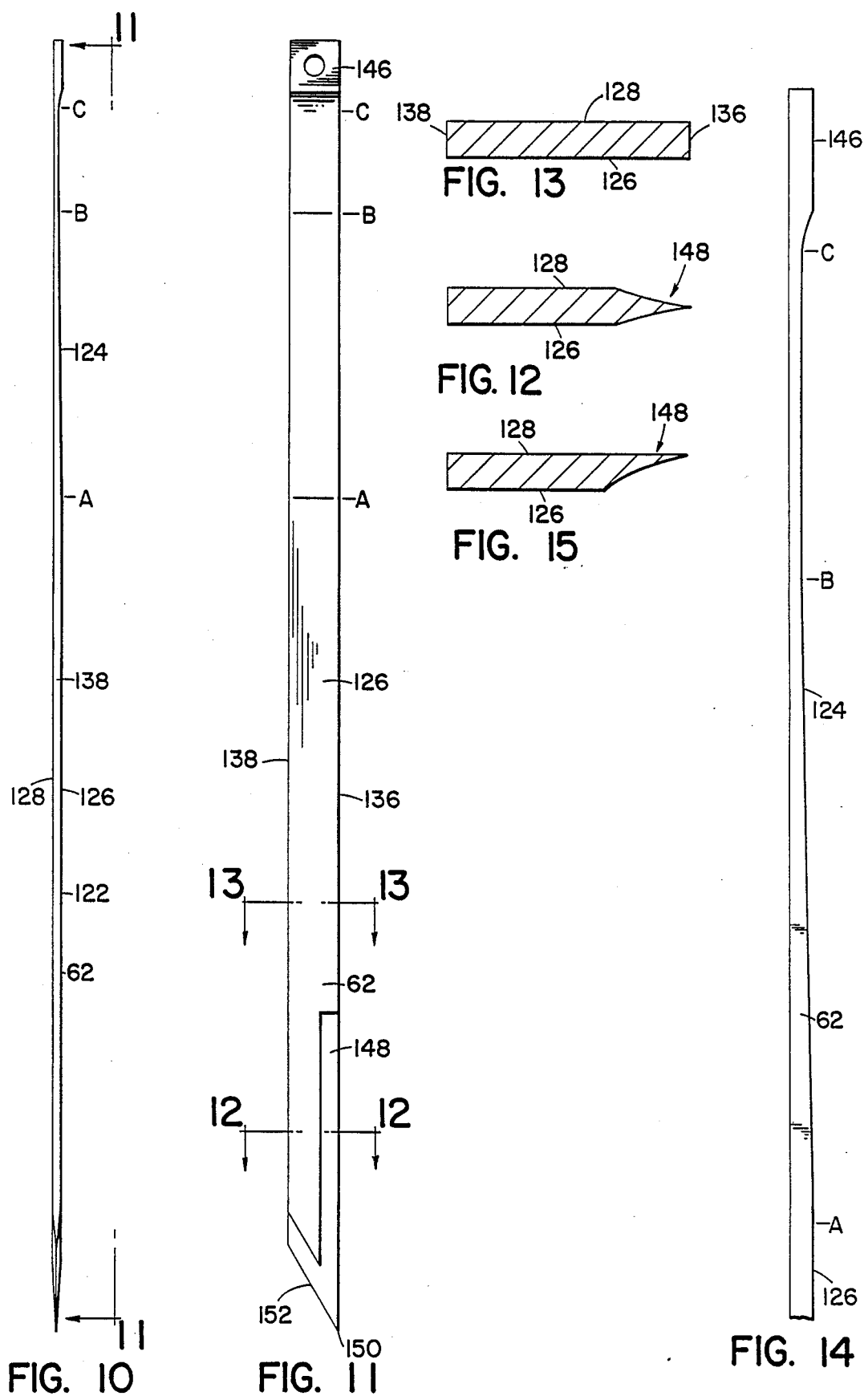

4,841,822

CUTTER HEAD AND KNIFE FOR CUTTING SHEET MATERIAL

BACKGROUND OF THE INVENTION

This invention relates to devices for cutting cloth and other similar sheet material spread on a supporting surface, and deals more particularly with improvements in a cutter head of the type employing as the cutting element an elongated knife reciprocated along an axis generally normal to the sheet material being cut and with improvements in the knife itself.

The general object of the invention is to provide a cutter head for cutting sheet material which is relatively inexpensive to manufacture and to maintain and which can operate reliably over long periods of service.

A further object of the invention is to provide a cutter head of the foregoing character which is particularly well adapted for use in cutting single plies of fabric or low layups of fabric at relatively high cutting speeds, but which may also be designed for cutting higher layups of fabric, the head being capable of being constructed so as to have a relatively low mass enabling it to be rapidly accelerated and decelerated with minimum power, and the head also being capable of driving the knife at a continuous high stroking speed on the order of 10,000 strokes per minute or more.

A more particular object of the invention is to provide a cutter head wherein the knife is rotatable about a theta axis to maintain it tangent to the line of cut yet wherein the motor used for driving or reciprocating the knife does not rotate about the theta axis and is drivingly connected with the knife through a differential drive eliminating the need for the conventional swivel link which is relatively massive and of complicated construction presenting maintenance problems, the elimination of the swivel mass reducing the mass driven by the knife drive motor and therefore permitting the use of a lower horsepower, less massive motor than used in previous cutter heads.

A further object of the invention is to provide a cutter head of the foregoing character using an eccentric mechanism for reciprocating the knife, the knife having a leaf spring portion which is directly connected to the eccentric member eliminating the conventional massive and failure prone connecting link and bearings joining the eccentric member to the knife.

In keeping with the foregoing object a further object of the invention is to provide such a cutter head including simple means for inhibiting fatigue failure of the leaf spring portion of the knife, such means including design of the leaf spring portion so to eliminate an area of stress concentration and parts for reducing the amplitude of vibration of the leaf spring portion.

Another object of the invention is to provide a cutter of the foregoing character wherein the knife along its lower end portion has a sharpened forward edge and the cutter head includes a simple sharpening mechanism capable, without change, of sharpening the knife by grinding the knife on the same side face during every sharpening cycle or to sharpen the knife on opposite side faces by grinding it on one side face during some sharpening cycles and on the other face during other sharpening cycles, and which sharpening mechanism also allows the angle of the ground surface or surfaces relative to the side faces of the knife to be varied, if desired.

Another object is to provide a cutter head having a guide engageable with the knife to restrain it, with minimal frictional loss, to reciprocation along a given axis.

Other objects and advantages of the invention will be apparent from the following detailed description of a preferred embodiment and from the accompanying drawings and claims.

A cutter head incorporating most or all of the features of the invention is particularly well adapted for use in an automatic cutting machine wherein the cutter head is carried by a tool carriage movable in two coordinate directions over the surface of the material being cut, and the invention is therefore hereinafter described in association with such a cutting machine. However, most of the features of the invention may be used to advantage in other cutter heads, such as the heads of hand-guided cutters, and there is accordingly no intention to limit the scope of the invention cutter heads for automatic cutting machines.

SUMMARY OF THE INVENTION

The invention resides in a cutter head, and a related knife, for cutting cloth or similar sheet material spread on a supporting surface, the cutter head having a base frame and a knife frame rotatable relative to the base frame about a theta axis. The knife frame supports both a guide for restraining the lower portion of the blade to reciprocating motion along the theta axis and a reciprocating mechanism connectible to the upper end of the blade. Therefore, when the knife frame, guide and knife rotate about the theta axis the reciprocating mechanism rotates with them. The knife drive motor, however, is fixed to the base frame, and a differential type drive is provided between the output shaft of the motor and the input shaft of the reciprocating mechanism enabling the motor to drive the reciprocating mechanism while at the same time permitting the knife frame to rotate relative to the base frame and motor.

The invention also resides in various other features related to the knife, these including the knife having an upper leaf spring portion which is directly connected to the eccentric of the reciprocating mechanism, the leaf spring portion of the knife along at least a part of its length having a tapered cross section providing a lowered bending stress and avoiding a concentration of stress at the root of the leaf spring portion, the combination with the leaf spring portion of two spaced stops which engage the leaf spring portion momentarily during its phases of maximum lateral deflection to prevent the build up of large amplitudes of resonant vibration, the knife guide having a plurality of pairs of rollers at different vertical levels for restraining the blade to the theta axis, and the combination with the lower end of the blade of a sharpener wheel movable from a retracted position to a sharpening position at which it can grind one or the other of the side faces of the knife depending on the angular position relative to the theta axis to which the knife is moved before the sharpening wheel is brought into contact with it.

BRIEF DESCRIPTION OF THE DRAWINGS

FIG. 3 is a front elevational view of the cutter head of FIG. 2, the base frame being shown in its lowered or cutting position relative to the tool carriage.

FIG. 4 is a side elevational view of the cutter head of FIG. 4, part of the tool carriage, being shown broken away for clarity and part of the knife frame being shown in vertical section.

FIGS. 5A, 5B, 5C and 5D are similar vertical views taken on a vertical plane passing through the roller guide of FIG. 3 and showing, respectively, the eccentric pin of the reciprocating mechanism at four diferent positions spaced ninety degrees from each other about the axis of the eccentric drive shaft.

FIG. 6 is a vertical sectional view through the knife guide showing the two rollers which engage the front and rear edges of the knife.

FIG. 7 is a horizontal sectional view taken on the line 7—7 of FIG. 6.

FIG. 9 is a vertical sectional view taken on the line 9—9 of FIG. 8.

FIG. 10 is a view looking toward the rear edge of the knife of the cutter of FIG. 2.

FIG. 11 is a side view of the knife taken on the line 11—11 of FIG. 10.

FIG. 12 is a cross sectional view taken on the line 12—12 of FIG. 11.

FIG. 13 is a cross sectional view taken on the line 13—13 of FIG. 11.

FIG. 14 is a fragmentary view in enlarged scale of a portion of the knife as seen in FIG. 10.

FIG. 15 is a view similar to FIG. 12, but showing an alternate way of sharpening the knife.

DETAILED DESCRIPTION OF THE PREFERRED EMBODIMENT

Figure 1:
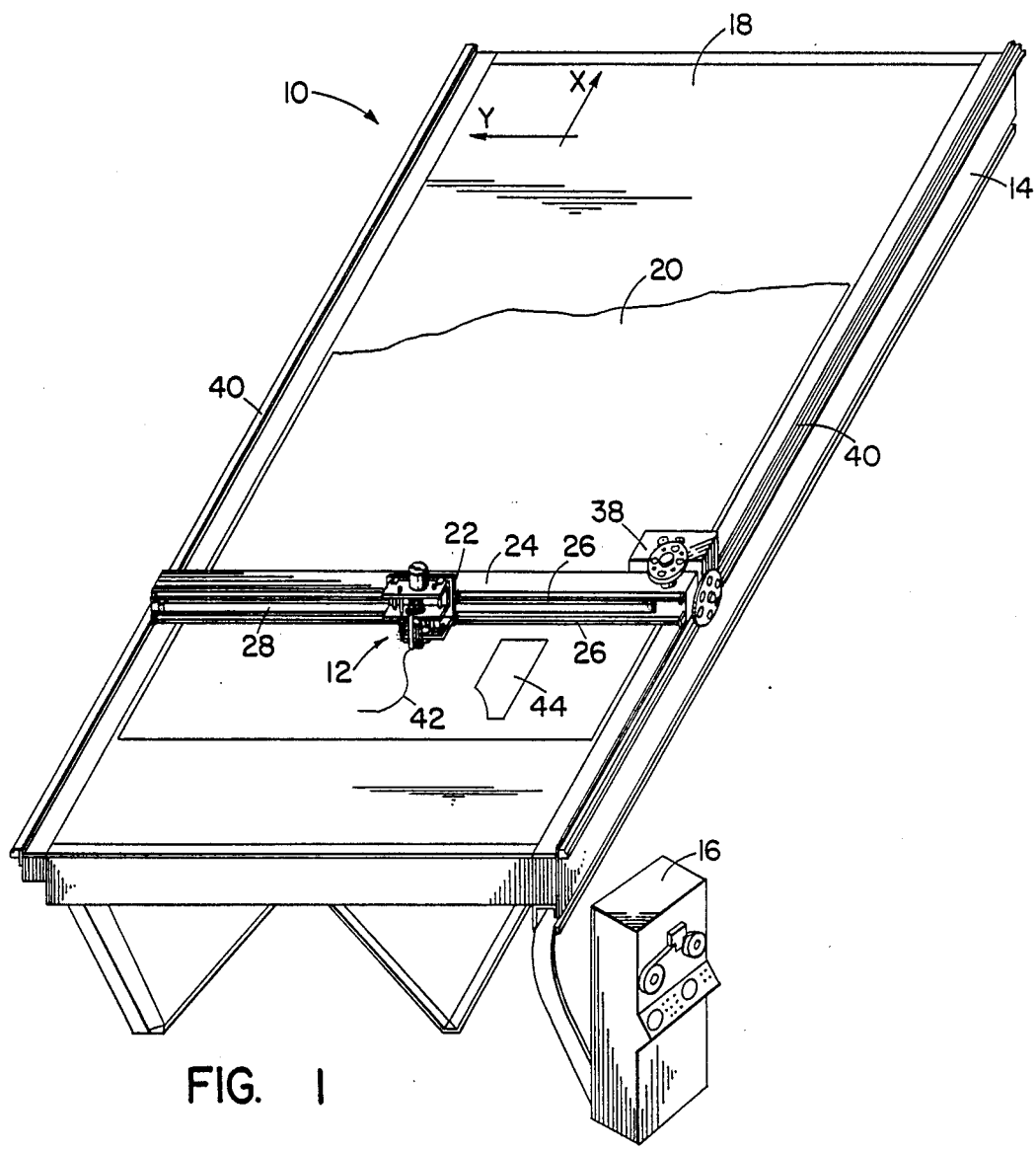
FIG. 1 is a perspective view showing a cloth cutting machine embodying the present invention.

FIG. 1 shows a cloth cutting machine, indicated generally at 10, having a cutter head, indicated generally at 12, embodying the present invention. In addition to the cutting head 12, the machine by way of major components is comprised of a cutting table 14 and a numerical controller 16. Preferably, the table 14 has associated with it a vacuum system for holding in place and compacting the material to be cut. Such vacuum system may, for example, be similar to that shown in copending application Ser. No. 736,838, filed May 22, 1985, in the name of the same inventor as this application, but such system is not necessary to the present invention and has been omitted in FIG. 1 for clarity.

The table 14 has an elongated, rectangular, horizontal and upwardly facing work support surface 18 for supporting the material to be cut in a spread condition. One sheet of such material is shown at 20. The machine 10 is intended to be a low cost, light-weight high speed machine particularly adapted to the cutting of a single layer of sheet material spread on the supporting surface 18, or to the cutting of a single web of sheet material which is folded upon itself to create two layers (such cutting being referred to as "cutting on the fold") or to the cutting of layups of sheet material consisting of relatively few layers. The invention is not however necessarily limited to the cutting of single layers or low height layup and may be incorporated into cutting systems for cutting layups of any height or number of layers.

The material forming the work support surface 18 of the table 14 may vary widely, but in any event it is one which allows the knife of the cutter head 12 to penetrate into it during a cutting operation. Preferably the support surface is formed by a plurality of bristle elements or blocks fitted together to form a continuous bristle bed, as in the aforementioned application Ser. No. 736,838, with the bristles extending vertically and preferably being substantially longer than the vertical stroke of the knife so that the lower end of the knife can remain constantly within the bristle bed throughout the full extent of each of its strokes during a cutting operation. The particular construction of the penetrable bed forming the support surface 18 is not, however, important to the present invention and need therefore not be described in more detail.

A part of the cutter head 12 is a tool carriage 22 which is supported on an X-carriage 24, by two guide bars 26, 26, for movement in the illustrated Y-coordinate direction. Such movement is effected by a drive belt 28 fastened to the tool carriage 22 and passing over pulleys at opposite ends of the carriage 24, one of which pulleys is powered by a motor contained in a service module 38 attached to the carriage 24, the motor in turn being controlled by the numerical controller 16. At each of its opposite ends the X-carriage 24 is guided for movement relative to the table 14 by a combined guide rail and rack 40 extending along the associated side edge of the table, the carriage 24 having pinions (not shown) at its opposite ends engaging the racks and powered by another motor in the service module 38 controlled by the controller 16. Thus, by combined movement of the X-carriage 24 in the X-coordinate direction and the tool carriage 22 in the Y-coordinate direction the cutter head 12 may be made to follow any desired line of cut on the sheet 20 to cut pattern parts or other similar components from the sheet, one such line of cut being indicated at 42 and one such pattern piece being indicated at 44.

The present invention resides primarily in the construction of the cutter head 12 and its associated knife whereby the cutter head may be made to have a relatively low weight allowing it to be rapidly accelerated and decelerated by reasonably sized motors while being of a rugged nature having low maintenance requirements and otherwise making it adaptable to low-cost, high-speed cutting of the material spread on the supporting surface 18.

Figure 2:
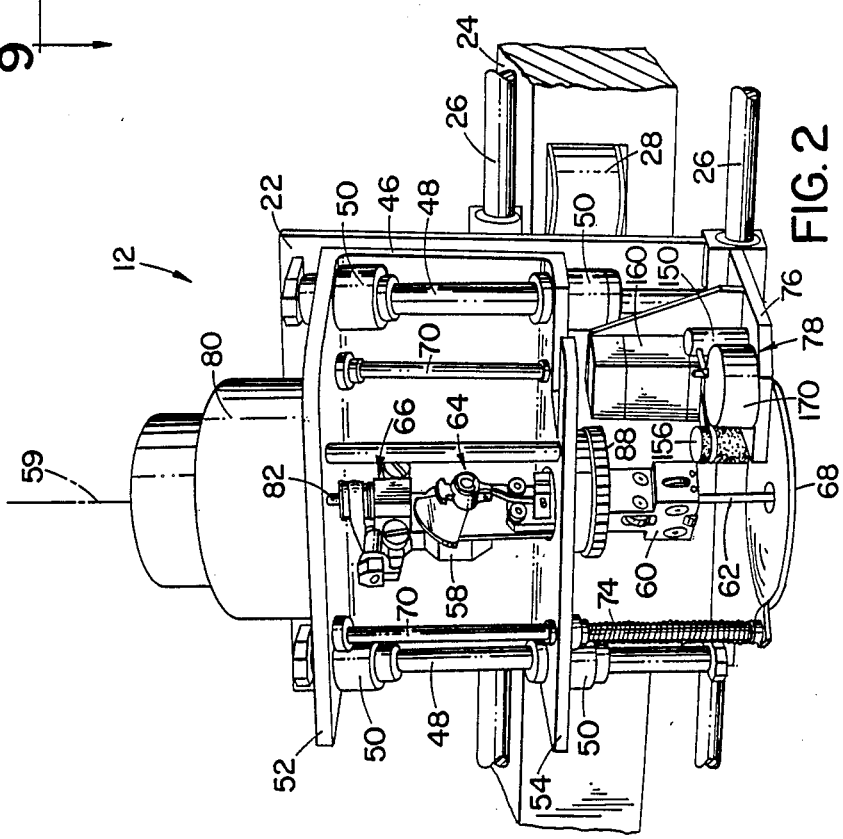
FIG. 2 is a perspective view of the cutter head of the machine of FIG. 1, the base frame being shown in its raised or noncutting position relative to the tool carriage.

For an understanding of the construction of the cutter head 12 reference may first be made to FIGS. 2, 3 and 4 for a description of its major parts and their arrangement. As seen from these figures, the cutter head 12 includes a base frame 46 which is supported for vertical movement relative to the tool carriage 22, by two vertical guide rods 48, 48 fixed to the tool carriage and by slide bearings 50, 50 fixed to the base frame and slidably receiving the rods 48, 48. FIG. 2 shows the base frame 46 in its raised or noncutting position relative to the tool carriage 22 and FIGS. 3 and 4 show it in its lowered or cutting position relative to the tool carriage 22. A pneumatic actuator (not shown) or similar motor is used to move the base frame between these two positions. As seen from the side in FIG. 4 the base frame 46 is basically a U-shaped member having an upper horizontal wall 52, a lower horizontal wall 54 and a vertical wall 56.

A knife frame 58 is carried by the base frame 46 for rotation relative to the base frame about a vertical theta axis 60. The knife frame 58 in turn carries a guide 60 for a vertically elongated knife 62, a reciprocating mechanism 64 and the major part of a drive mechanism 66 for the reciprocating mechanism 64.

Also carried by the base frame 46 is a presser foot 68 attached to the lower ends of two vertical rods 70, 70. The rods 70, 70 are vertically slidable relative to the two horizontal walls 52 and 54 of the base frame and are limited in their downward movement relative to the base frame by a spring clip 72 at the upper end of each rod. A helical compression spring 74 surrounds the lower portion of each rod 70 and urges the rods and the presser foot 68 downwardly relative to the base frame. When the base frame 46 is in its raised position, as shown in FIG. 2, the presser foot 68 and the rods 70, 70 are in their lowermost positions with the presser foot 68 nevertheless being raised above the surface of the underlying sheet material 20 to be cut. As the base frame is moved from its raised position to its lowered cutting position the presser foot 62 is brought into engagement with the surface of the material 20 before the base frame reaches the lowermost limit of its movement and thereafter continued downward movement of the base frame causes the springs 74, 74 to be compressed causing the presser foot 62 to exert a pressing force on the material 20.

For sharpening the knife 62 the tool carriage 22 has a horizontally extending wall portion 76 located below the bottom wall at 54 of the base frame and supporting a sharpening mechanism, indicated generally at 78, operable to sharpen the blade 62, as explained in more detail hereinafter, when the base frame 46 is in its raised noncutting position as shown in FIG. 2.

The motor for driving the knife 62 in its reciprocating motion is indicated at 80. In accordance with the invention this motor is fixed to the base frame 46 while the reciprocating mechanism 64 rotates with the knife 62 about the theta axis 59, the arrangement of the motor 80 and the drive means 66 being such as to allow the motor 80 to drive the reciprocating mechanism 5S while nevertheless permitting the knife frame with the reciprocating mechanism 64 and knife guide 60 to rotate about the theta axis. This arrangement may be achieved in various different ways without departing from the broader aspects of the invention, but in the illustrated case the motor 80 is fixedly mounted to the top wall 52 of the base frame 46 and has an output shaft 82 aligned with the theta axis 59.

The means for mounting the knife frame 58 to the base frame 46 for rotation about the theta axis 59 comprises, as best seen in FIG. 4, a main ball bearing unit 84 between the knife frame 58 and the lower wall 54 of the base frame, and a smaller bearing unit 86 interposed between the upper end of the knife frame 58 and the output shaft 82 of the motor 80. As to the bearing 86 it will be understood that the motor 80 has its own internal bearing or bearings supporting the output shaft 82 for rotation about, and restraining it against lateral deflection away from, the theta axis 59. Therefore, the bearing 86 in cooperation with the output shaft 82 of the motor provides additional radial support for the upper portion of the knife frame 58 while permitting it to rotate about the theta axis 59.

Attached to the knife frame 58 below the main bearing 52 is a gear wheel 88 driven through a suitable gear train by a theta motor 90 (FIG. 3) to control the positioning of the knife frame and knife about the theta axis. A conventional resolver (not shown) associated with the motor 90 provides a feedback signal to the controller 16, and during a cutting operation the controller controls the theta motor in such as way as to maintain the knife 62 tangent to the line of cut. Also, as explained hereinafter, during a sharpening operation the theta motor rotates the knife to the proper position about the theta axis for cooperation with the sharpening wheel of the sharpening mechanism 78.

The reciprocating mechanism 64 has an input or eccentric shaft 92 (FIG. 4) supported by the knife frame 58 for rotation relative to the knife frame about a horizontal axis 94 intersecting the vertical theta axis 59, the support means for the shaft 92 including a ball bearing unit 96 and a roller bearing unit 98.

The drive means 66 for drivingly connecting the output shaft 82 of the motor 80 to the input shaft 92 of the reciprocating mechanism comprises a first pulley 100 fixed to the motor shaft 82, a second pulley 102 fixed to the reciprocating mechanism input shaft 92 and two idler pulleys 104 and 106 (best seen in FIG. 3) carried by the knife frame 58 for rotation about a common horizontal axis 108 perpendicular to the plane containing the axes 59 and 94, the two rollers 104 and 106 being located on opposite sides of that plane. A drive belt 110 passes over the pulleys 100, 102, 104 and 106 to complete the drive mechanism which it will be observed a type of differential drive allowing the rotation of the motor shaft 82 to be transmitted to the shaft 92 while also permitting the knife frame 58 with the shaft 92 to rotate about the theta axis.

In addition to the input or eccentric shaft 92, the reciprocating mechanism 64 also includes an eccentric member in the form of a pin spaced radially from the axis 94 and fixed to the shaft 92 along with a counterweight 114. Pivotally received on the eccentric pin 112 is a chuck 116 which grips the upper end of the blade 64, the blade being fixed to the chuck by means of a screw 118. A counterweight 120 is included in the chuck 118 to counterbalance the weight of the screw 118 and the associated portions of the chuck.

The blade 62 is made of a metal, such as M-2 high speed steel. As mentioned, it is connected directly to the chuck 116 and because of this includes not only a lower cutting portion 122 but also an upper leaf spring portion 124 which resiliently deflects laterally of the theta axis 59 to accommodate the lateral component of the motion of the eccentric pin 112, the leaf spring portion 124 therefore eliminating the rigid connecting link and bearings often used to connect an eccentric member to a knife in prior cutter head constructions.

The particular construction of the knife 62 is described in more detail hereinafter in connection with FIGS. 10 to 15. For the moment, however, it can be noted that the guide 60 engages the lower portion 122 of the knife to restrain it to reciprocating motion along the theta axis 59. For this restraining action the guide 60 employs a plurality of rollers which engage the knife and hold it laterally in place with minimum frictional loss. Referring for example to FIG. 5A, the guide 60 includes three pairs of rollers which engage the side faces 126 and 128 of the knife at three different vertical levels to prevent it from deflecting at those levels away from the theta axis 59. The two uppermost pairs of rollers are provided by four bearings 130, 130 the outer races of which engage the knife. The lowermost pair of rollers is comprised of two rollers 132, 132. Each of these rollers 132, 132 is preferably fixed to its supporting shaft so that the shaft rotates with the roller and relative to the body of the guide 60 which supports the shaft on opposite sides of each roller to provide better stability for each roller and increased bearing surface between the rotating parts.

In addition to the three pairs of rollers engaging the side faces 126 and 128 of the knife, the guide 60 also includes one pair of rollers 134, 134, as best seen in FIGS. 6 and 7 for engaging the forward edge 136 and rear edge 138 of the knife 62. The rollers 134, 134 are are each fixed to an associated shaft 140, each shaft 140 on each side of its roller being rotatably supported by an insert 142 carried by the body of the guide 60. Similarly to the case with the rollers 132, 132 the fixing of each roller 134 to its shaft 140 provides stability for the roller and also provides a maximum bearing surface between the rotating parts, the rotating parts being the shaft 140 and the two associated inserts 142.

The leaf spring portion 124 of the knife 62, as seen for example in FIG. 5A, is essentially unsupported between the upper set of rollers 130, 130 of the guide 60 and the chuck 116 of the reciprocating mechanism. Because of this absence of support, standing waves and other vibrations may be set up in the leaf spring portion as the knife is reciprocated. Such vibrations, particularly those occurring at or near the resonant frequency of the leaf spring portion, tend to increase in amplitude from one reciprocation cycle to the next as the knife is reciprocated from an at rest condition with the leaf spring portion quickly developing high amplitudes of vibrations detrimental to its life. To inhibit the development of such high amplitudes of vibration the knife frame includes at least one antivibration stop, and preferably as shown two such stops, for engaging the leaf spring portion of the blade momentarily during each cycle of reciprocation to prevent or restrict vibration of the leaf spring portion at the point of contact and to thereby prevent high amplitudes of vibration from developing.

In the illustrated case the antivibration stop means comprises two spaced rollers 144, 144 carried by the knife frame 58 for rotation about horizontal axes parallel to the side faces 126, 128 of the knife 62. The two rollers 144, 144 are so spaced from the theta axis 59 as to each momentarily engage the leaf spring portion 124 of the knife as the leaf spring portion passes through a position of maximum flexure. This operation is explained by FIGS. 5A, 5B, 5C and 5D showing the eccentric pin 112 in successive positions spaced ninety degrees from one another as the eccentric pin travels through one revolution.

The position of the eccentric pin 112 shown in FIG. 5A may be taken as the zero degree position and the pin may be taken to orbit clockwise about the axis 94 as indicated by the arrow. In this zero degree position the pin 112 is located on the theta axis 59 and the leaf spring portion 124 is spaced from both of the rollers 144, 144. As the pin 112 moves from the FIG. 5A position the leaf spring portion of the blade 124 reaches a position of maximum flexure to one side of the theta axis 59 as the eccentric pin 112 comes to or near the ninety degree position of FIG. 5B. In this flexed position of the leaf spring portion 124 it engages, or at least comes very close to, the left roller 144 to limit the amplitude of vibration of the leaf spring portion at the point adjacent the roller to zero or some small value. Shortly after the pin 112 leaves the ninety degree position of FIG. 5 the leaf spring portion 154 loses contact with the left roller 144 and moves toward the 180 degree position shown in FIG. 5C at which the knife 62 is raised to its uppermost position with the leaf spring portion 124 being free from contact with each of the rollers 144, 144. Then as the eccentric pin 112 moves to or near the 270 degree position shown by FIG. 5D, the leaf spring portion is moved to a position of maximum flexure to the right of the theta axis 59 and is brought into momentary contact with or proximity to the right roller 144 to again create an amplitude limiting condition. Thereafter, the pin 112 returns to the zero degree position of FIG. 5A to complete the revolution and to begin a new one.

Figure 5B:
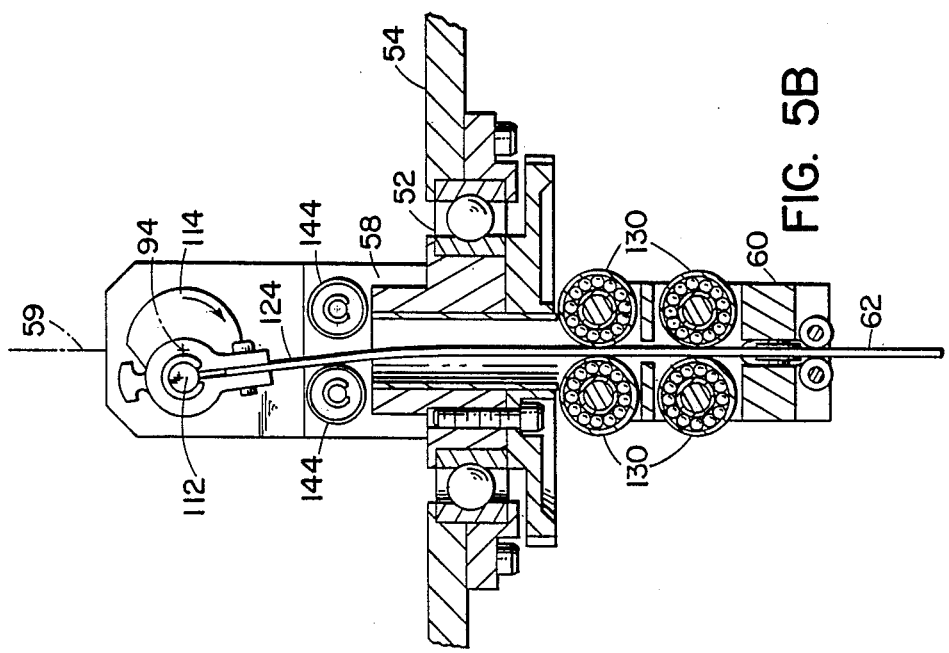
Figure 5A:
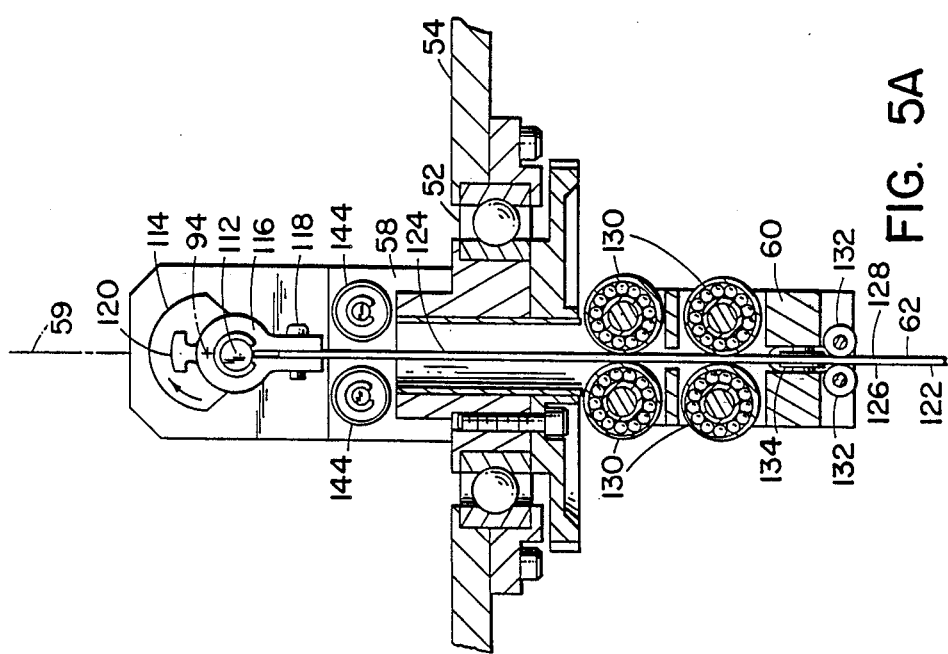

Referring to FIGS. 5B and 5D it will be noted that except for the brief moments during each revolution of the eccentric pin 112 that the leaf spring portion 124, is brought into contact with or proximity to one or the other of the antiresonance rollers 144, 144 the leaf spring portion 124 is flexed essentially as a cantilever beam with the rollers of the guide 60 holding the lower portion of the blade to the theta axis and with the chuck of the reciprocating mechanism applying a lateral force to the upper end of the leaf spring portion deflecting it laterally to one side or the other of the theta axis. In a beam of uniform cross section such cantilever bending creates an area of maximum bending stress at the root of the beam, and the bending stress decreases linearly in going from the root of the beam to the free end at which the bending force is applied. In the case of the the knife 62 such bending stress concentration would occur at the root of the leaf spring portion 124 in the vicinity of the upper pair of rollers 130, 130 of the guide 60.

To lower the bending stress in the leaf spring portion and to avoid a stress concentration at its root, the leaf spring portion 124 along at least a part of its length and starting at its root is shaped to provide a variable cross section causing the upper end of the leaf spring portion to be more flexible than it would be without such variable cross section, thereby requiring a smaller force to deflect it to the maximum deflected positions achieved by the reciprocating mechanism. Since smaller forces are required to achieve the maximum deflections, smaller bending stresses are obviously set up in the leaf spring portion. Also, the variable cross section causes the bending stress to be more uniform along that part of the length of the knife, thereby eliminating or reducing any concentration of bending stress at the root of the leaf spring portion.

The variation in cross section used to make the upper end of the leaf spring portion more flexible (i.e. deflectable to a given position by a smaller force) and to achieve a more uniform bending stress may be obtained in different ways, but preferably and as shown in FIGS. 10, 11 and 14 it is achieved by varying the thickness of the knife while keeping the width of the knife substantially constant, the thickness being the dimension between the side faces 126 and 128 and the width being the dimension between the forward and rear edges 136 and 138.

Referring to FIGS. 10 through 15, the dividing line between the lower portion 122 of the knife and the upper leaf spring portion 124 of the knife occurs at the point A which when the knife is in its lowermost position is located only a very short distance above the nip of the upper pair of rollers 130, 130 of the guide. Immediately below the point A the lower portion 122 of the blade has a constant thickness so that the associated rollers of the guide 60 will remain in contact with the side faces of the knife throughout the full extent of each cycle of reciprocation. Between the point A and the point C the leaf spring portion 124 of the blade is tapered in such a direction that the thickness decreases in proceeding upwardly from the point A toward the point B, and the rate of change of thickness is so chosen that the bending stress created in the laterally outer fibers of the knife by deflection of the upper end of the leaf spring portion away from the theta axis will be substantially uniform at all points along the length of the leaf spring portion between the points A and B. Between the points B and C the leaf spring portion 124 has a constant thickness, and above the point C the thickness widens to create an upper end portion 146 suitable for gripping by the chuck 116. The change in thickness in the illustrated case is achieved by starting with a knife blank of uniform thickness and by grinding one side face. If desired, both side faces may be ground to produce a more symmetrical shape.

The lower part of the lower portion 122 of the knife is sharpened along the forward edge of the knife 136 as indicated at 148. The forward edge 136 proceeds downwardly to a point 150, and a sharpened bottom edge 152 inclines upwardly from the point 150 to the rear edge 138. The bottom edge 152 is sharpened prior to installation of the knife in the cutter head and is not thereafter sharpened by the sharpening mechanism 78. The sharpened edge 148 performs the major portion of the cutting during a cutting operation and is periodically sharpened by the sharpening mechanism 78.

A feature of the sharpening mechanism 78 is that the knife 62 as to the sharpened portion 148 may be sharpened either as shown in FIG. 12 by grinding both side faces 126 and 128 of the knife or may be sharpened as shown in FIG. 15 by grinding only one of the side faces.

Figure 8:
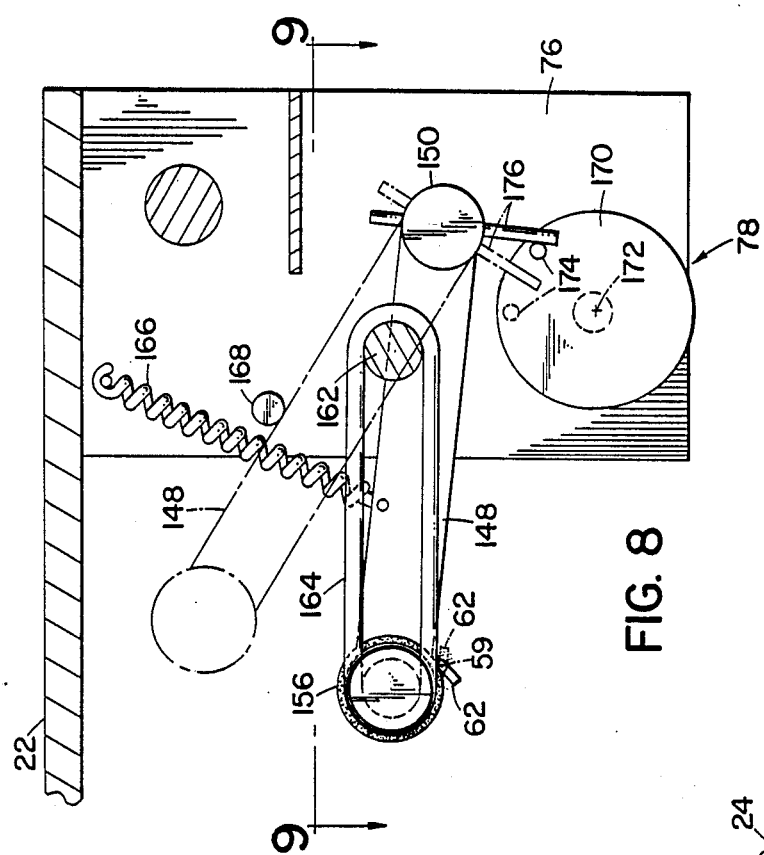
FIG. 8 is a horizontal sectional view taken on the line 8—8 of FIG. 3, but with the base frame raised to its noncutting position and sharpener arm moved to its sharpening position.

Turning to FIGS. 8 and 9, the sharpening mechanism 78 includes a sharpener arm 148 rigidly fixed to a hub 150 supported for rotation relative to the tool carriage wall 76 about a first vertical axis 152. Supported on the outer end of the arm 148 for rotation relative to it about a second vertical axis 154 is a sharpening wheel 156 consisting of a body having a drive groove 158 intermediate its ends and an abrasive grit 161 bonded to the outer surface of the body. The sharpening wheel is driven in rotation about the second vertical axis 154 by a motor 160 through a pulley 162 and an O-ring drive belt 164 engaging the wheel's groove 158. A tension spring 166 normally holds the arm 148 in a retracted position against a stop 168 as shown by the broken lines of FIG. 8. From this position the arm is movable to an active sharpening position, as shown by the solid lines of FIG. 8, at which the sharpening wheel 156 is brought into engagement with the knife 62. For effecting this movement of the arm 148 the sharpening mechanism 78 includes a rotary electrical solenoid actuator 170 having an output member rotatable about a vertical axis 172 and carrying a vertically extending pin 174. When the actuator 170 is deenergized the pin 174 is biased by an internal spring to the position shown by the broken lines in FIG. 8. When the solenoid is energized the pin 174 rotates counterclockwise about the axis 172, as seen in FIG. 8, from the broken line position to the full line position and in the course of this movement engages a horizontal pin 176 fixed to the hub 150 thereby rotating the sharpener arm 148 from its retracted to its active position.

In the course of a sharpening cycle the base frame 46 is first raised relative to the tool carriage 22 to its non-cutting position to bring the part of the blade which projects downwardly out of the guide 60 to the vertical level of the sharpening wheel 156. The knife is then rotated to the proper position about the theta axis for sharpening and the sharpening wheel is then brought into contact with it by swinging of its arm 148. During the sharpening the blade is reciprocated, preferably at a lower stroking speed than used for cutting cloth, so that the sharpening wheel engages and sharpens the full extent of the sharpened portion 148. The body of the wheel is slightly conical, the upper end being of slightly smaller diameter than the bottom end, to accommodate the bending of the knife which occurs as the wheel is pressed against it and to thereby cause the wheel to exert a substantially uniform sharpening effect on the knife along the length of the knife engaged by the wheel. The cone angle a indicated in FIG. 9 is in the order of a few degrees and is exaggerated in FIG. 9 for clarity. The same effect can also be achieved by making the body of the wheel 56 cylindrical and by tilting its axis 154 relative to the theta axis 59.

From the foregoing, and from FIG. 8, it will also be understood that through the positioning of the knife 62 about the theta axis 59 the sharpening wheel 56 during alternate sharpening cycles may be made to sometimes sharpen one side and some other times the other side of the blade to create a sharpened edge such as shown in FIG. 12. That is, as shown in FIG. 8, during one sharpening cycle the blade 62 is positioned as shown by the broken lines and during another sharpening cycle it is positioned as shown by the solid lines. Alternatively, every time the blade 62 is sharpened it may be rotated to the same position about the theta axis so that only one side of it is sharpened to create a sharpened edge such as shown by FIG. 15. Also, the angle of the knife about the theta axis may be varied to control the bluntness of the sharpened edge, that is the angle the ground surface or surfaces make with the side faces of the knife. For example, it may be desirable to change the bluntness with decreases in the width of the knife occurring as a result of repeated sharpening, and this can be done under control of the controller 16.

I claim:

1. In a cutter head for use as part of a machine for cutting sheet material, the combination comprising:
   a base frame vertically movable between a raised position and a lowered position,
   a knife frame carried by said base frame and rotatable relative to said base frame about a theta axis fixed relative to said base frame,
   knife guide means carried by said knife frame for supporting a knife for reciprocation relative to said knife frame along an axis parallel to said theta axis and for movement with said knife frame about said theta axis,
   a knife reciprocating mechanism carried by said knife frame and including an input shaft rotatable about a shaft central axis fixed relative to said knife frame and rotatable about said theta axis with said knife frame when said knife frame is rotated, said knife reciprocating mechanism being operable to reciprocate a knife supported by said knife guide means along said theta axis relative to said knife frame in response to rotation of said input shaft about said shaft central axis,
   a knife drive motor fixed to said base frame and having a rotatable output shaft, and
   a drive means drivingly connecting said output shaft of said knife drive motor to said input shaft of said knife reciprocating mechanism while permitting said knife frame and said knife reciprocating mechanism to rotate about said theta axis independently of said knife motor.

2. The combination defined in claim 1 further characterized by a second motor fixed to said base frame, and drive means drivingly connecting said second motor to said knife frame for rotating said knife frame about said theta axis.

3. The combination defined in claim 1 further characterized by said output shaft of said knife drive motor being aligned with said theta axis.

4. The combination defined in claim 3 further characterized by a bearing between said knife frame and said output shaft of said knife drive motor for rotatably supporting said knife frame from said output shaft for rotation about said theta axis.

5. The combination defined in claim 3 further characterized by said shaft central axis about which said input shaft of said knife reciprocating mechanism is rotatable being perpendicular to and intersecting said theta axis.

6. The combination defined in claim 5 further characterized by said drive means including a first pulley on said rotatable output shaft of said knife drive motor, a second pulley on said input shaft of said knife reciprocating mechanism and third and fourth idler pulleys, said third and fourth idler pulleys being located on a common axis perpendicular to the plane containing said theta axis and said axis of said reciprocating mechanism input shaft and being located on opposite sides of said plane, and a drive belt passing around said first, second, third and fourth pulleys to transmit the rotation of said motor output shaft to said reciprocating mechanism input shaft while permitting said knife frame to rotate relative to said base frame about said theta axis.

7. The combination defined in claim 6 further characterized by said reciprocating mechanism including an eccentric member fixed relative to said reciprocating mechanism input shaft and spaced radially from said central axis of said input shaft, and a chuck pivotally connected to said eccentric member for grasping a knife supported by said knife guide means.

8. The combination defined in claim 7 further characterized by a knife received and supported by said knife guide means and gripped by said chuck so as to reciprocate relative to said knife guide means in response to rotation of said reciprocating mechanism input shaft, said knife including a leaf spring portion between said knife guide means and said chuck.

9. The combination defined in claim 8 further characterized by said leaf spring portion of said knife having a tapered thickness along at least a part of the length of said leaf spring portion, said tapering of the thickness of said leaf spring portion along part of the length thereof being such that along said part of the length of said leaf spring portion the thickness decreases in proceeding away from said knife guide means.

10. The combination defined in claim 8 further characterized by a pair of rollers located on opposite sides of said leaf spring portion of said knife between said knife guide means and said reciprocating mechanism, said pair of rollers being so spaced from one another and from said theta axis in the direction laterally of said leaf spring portion of said knife that each of said rollers is engageable with said leaf spring portion of said knife during only a small portion of each cycle of reciprocation of said knife to inhibit the development of large amplitudes of vibration in said leaf spring portion.

11. The combination defined in claim 10 further characterized by said knife having two opposite side faces and forward and rear edges, and said knife guide means including at least one pair of rollers engaging said opposite side faces of said knife to restrain said knife against lateral deflection away from said theta axis.

12. The combination defined in claim 10 further characterized by a tool carriage supported for movement in two coordinate directions relative to the surface of a piece of sheet material to be cut, means mounting said base frame on said tool carriage for movement along said theta axis between a cutting position and a noncutting position, a sharpener arm pivotally connected to said tool carriage for movement about a first axis parallel to said theta axis, a sharpening wheel rotatably mounted on said sharpening arm for rotation relative to said arm about a second axis parallel to said theta axis, said sharpener arm being movable about said first axis between a retracted position at which said sharpening wheel is spaced from said theta axis, and a sharpening position at which said sharpening wheel is positioned adjacent said theta axis to engage said knife when said base frame is in said noncutting position, drive means including a motor for rotating said sharpening wheel about said second axis, means biasing said sharpener arm toward said retracted position, and an actuator for moving said arm from said retracted position to said sharpening position against the force of said biasing means.

13. In a cutter head for cutting sheet material, the combination comprising: a vertically elongated knife having a width defined by the dimension between the forward and rear edges of said knife and having a thickness defined by the dimension between said faces of said knife and having a lower portion guided for reciprocation along a vertical axis and an upper leaf spring portion with an upper end, an eccentric member connected to said upper end of said leaf spring portion of said knife and rotatable through a full revolution about a horizontal axis, said upper end of said leaf spring portion during each revolution of said eccentric member being moved up and down to reciprocate said lower portion of said knife and being moved laterally back and forth between positions on either side of said vertical axis accompanied by flexing of said leaf spring portion, said leaf spring portion during each revolution of said eccentric member also passing through a first position of maximum flexure on one side of said vertical axis and through a second position of maximum flexure on the opposite side of said vertical axis, and stop means for momentarily engaging said leaf spring portion of said knife at a point spaced from both of its ends each time it passes through at least one of said positions of maximum flexure to inhibit the development of large amplitudes of vibration in said leaf spring portion, said leaf spring portion of said knife being out of engagement with said stop means during the major portion of each revolution of said eccentric member.

14. The combination defined in claim 13 further characterized by said leaf spring portion of said knife along at least a part of its length having a tapered thickness such that said thickness decreases in proceeding upwardly along said part of the length of said leaf spring portion.

15. The combination defined in claim 14 further characterized by said tapering thickness of said part of the length of said leaf spring portion being such as to cause said upper end of said leaf spring portion to be deflectable to a given position laterally away from said vertical axis by a substantially smaller force than would be required to deflect it to such position in the absence of said tapering thickness.

16. The combination defined in claim 13 further characterized by said means for momentarily engaging said leaf spring portion comprising two stops located on opposite sides of and spaced laterally of said vertical axis.

17. The combination defined in claim 13 further characterized by each of said stops being a roller rotatable about an axis extending parallel to said side faces of said knife in a plane perpendicular to said vertical axis.

18. In a cutter head for cutting sheet material, the combination comprising:
   a knife frame rotatable about a vertical axis,
   a vertically elongated knife having an upper end portion, a lower portion and a leaf spring portion between said upper end portion and said lower portion, and also having opposite side faces, said knife having a thickness defined by the dimension between said side faces and having a width defined by the dimension between forward and rear edges of said knife,
   a knife guide carried by said knife frame supporting said lower portion of said knife for reciprocation relative to said knife frame along said vertical axis,
   a knife reciprocating mechanism carried by said knife frame and including an input shaft rotatable about a shaft central axis fixed relative to said knife frame and about said vertical axis with said knife frame when said knife frame is rotated,
   drive means for drivingly rotating said input shaft of said reciprocating mechanism,
   said reciprocating mechanism including an eccentric member fixed to said input shaft for rotation therewith and a chuck pivotally connected to said eccentric member and grasping said upper end portion of said knife,
   said knife guide having means engagable with both of said side faces of said knife at a vertical level spaced a substantial distance below said input shaft of said reciprocating mechanism to restrain said knife at said vertical level from deflecting in either lateral direction away from said vertical axis,
   said leaf spring portion of said knife extending upwardly from said knife guide between said vertical level of said knife guide and said upper end portioin of said knife,
   said reciprocating mechanism as a result of rotation of said input shaft moving said upper end portion of said knife, through said eccentric member and said chuck, vertically up and down to reciprocate said lower portion of said knife along said vertical axis and also moving said upper end portion of said knife laterally back and forth between positions on opposite sides of said vertical axis accompanied by lateral flexing of said leaf spring portion, said leaf spring portion during each revolution of said input shaft passing through a first position of maximum flexure on one side of said vertical axis and also passing through a second position of maximum flexure on the other side of said vertical axis, and
   stop means carried by said knife frame for momentarily engaging one side face of said leaf spring portion of said knife at a point spaced above said vertical level as said leaf spring portion passes through said first position of maximum flexure and for momentarily engaging the other side face of said leaf spring portion of said knife at a point spaced above said vertical level as said leaf spring portion passes through said second position of maximum flexure, said leaf spring portion of said knife being out of engagement with said stop means during the major portion of each revolution of said eccentric member.

19. The combination defined in claim 18 further characterized by said leaf spring portion of said knife along at least a part of its length having a tapered cross section such that said upper end portion of said knife is deflectable laterally away from said vertical axis to a given position by a substantially smaller force than would be required to achieve the same deflection in the absence of said tapered cross section.

20. The combination defined in claim 18 further characterized by said means for momentarily engaging said side faces of said leaf spring portion of said knife comprising two rollers carried by said knife frame for rotation about horizontal axes parallel to said side faces of said knife and spaced laterally from said vertical axis.

21. The combination defined in claim 18 further characterized by said knife guide having a plurality of pairs of rollers engageable with both of said side faces of said knife at different vertical levels to restrain said knife at said vertical levels from deflecting in either lateral direction away from said vertical axis.

22. The combination defined in claim 18 further characterized by a base frame, and means supporting said knife frame from said base frame for rotation about said vertical axis, said drive means for drivingly rotating said input shaft of said reciprocating mechanism including a drive motor fixed to said base frame and drive means drivingly connecting said drive motor to said reciprocating mechanism while permitting said knife frame to rotate relative to said base frame about said vertical axis.

23. The combination defined in claim 22 further characterized by said drive motor having an output shaft aligned with said vertical axis, and a bearing between said output shaft and said knife frame for rotatably supporting said knife frame from said output shaft for rotation about said vertical axis.

24. In a cutter head for cutting sheet material, the combination comprising: an elongated knife having a lower portion guided for reciprocation along a vertical axis and an upper leaf spring portion with an upper end, said knife having a width defined by the dimension between forward and rear edges and having a thickness defined by the dimension between side faces, and an eccentric member connected to said upper end of said leaf spring portion of said knife and rotatable about a horizontal axis so that during each revolution of said eccentric member said upper end of said leaf spring portion is moved up and down to reciprocate said lower portion of said knife and is moved laterally back and forth between positions on either side of said vertical axis accompanied by flexing of said leaf spring portion, said leaf spring portion along at least a part of its length having a cross section which varies in said thickness dimension gradually in proceeding along the length of said portion and in such a way that the force required to deflect said upper end of said leaf spring portion laterally to a given position spaced from said vertical axis is substantially smaller than would be required in the absence of said varying cross section.

25. The combination defined in claim 24 further characterized by said leaf spring portion of said knife along said part of the length thereof having a substantially constant width and a thickness which tapers so as to decrease in moving toward said upper end of said knife.

26. The combination defined in claim 24 further characterized by said leaf spring portion of said knife having an upper part of constant cross section and a lower part of varying cross section.

27. The combination defined in claim 26 further characterized by said leaf spring portion of said knife having a substantially constant width along its length, and said knife along said part of the length thereof having a tapered thickness.

28. A knife for use in a cutter head for cutting sheet material, said knife being made of one piece of material and being elongated and having a lower portion sharpened along at least a portion of its length and an unsharpened upper leaf spring portion with an upper end, said knife having a normal condition in which said lower portion and said leaf spring portion lie along a straight axis, said leaf spring portion of said knife being of generally rectangular cross section with opposite side faces separated by a thickness dimension and front and rear edges separated by a width dimension greater than said thickness dimension, the cross section of said leaf spring portion along at least a part of its length varying gradually in said thickness dimension in proceeding along the length of said portion and in such a way that the force required to deflect said upper end laterally away from said straight axis to a given position while said lower portion is held to said straight axis is substantially smaller than would be required in the absence of said varying cross section in said thickness dimension.

29. A knife as defined in claim 28 further characterized by said leaf spring portion along said part of the length thereof having a substantially constant width and a thickness which tapers so that said thickness decreases in moving toward said upper end of said leaf spring portion.

30. The combination defined in claim 28 further characterized by said leaf spring portion of said knife having an upper part of constant cross section and lower part of varying cross section.

31. The combination defined in claim 30 further characterized by said leaf spring portion of said knife having a substantially constant width along its length, and said knife along said part of the length thereof having a varying cross section having a tapered thickness.

32. In a cutter head for use as part of a machine for cutting sheet material, the combination comprising:
a base frame,
a knife supported by said base frame for reciprocation along a first vertical axis,
a tool carriage movable in two coordinate directions relative to the surface of a piece of sheet material to be cut,
means mounting said base frame to said tool carriage for vertical movement relative to said tool carriage solely in a vertical direction between a lowered cutting position and a raised noncutting position and preventing rotation of said base frame relative to said tool carriage about any vertical axis,
a sharpener arm supported on said tool carriage for movement about a second vertical axis spaced from said first vertical axis,
a sharpener wheel supported on said sharpener arm for rotation relative to said sharpener arm about a third substantially vertical axis spaced from said second vertical axis,
said sharpener arm being moveable about said second vertical axis between a retracted position at which said sharpener wheel is spaced from said first vertical axis and a sharpening position at which sharpening wheel is positioned adjacent said first vertical axis to engage and sharpen said knife when said base frame is in its raised noncutting position relative to said tool carriage,
means for rotating said sharpener wheel about said third vertical axis,
means for moving said sharpener arm between said retracted and sharpening positions, and
wherein said second vertical axis is fixedly positioned on said tool carriage such that movement of said sharpener wheel is confined to between said position adjacent said first vertical axis and said retracted position.

33. The combination defined in claim 32 further characterized by means supporting said knife for rotation about said first vertical axis to allow said sharpener wheel to engage and sharpen either one of the two side faces of said knife.

34. The combination defined in claim 32 further characterized by said sharpener wheel comprising a body of revolution with a belt drive groove located intermediate its ends and having grit bonded to its outer surface, and by said means for rotating said sharpening wheel including a motor carried by said tool carriage and having an output shaft with a pulley, and a drive belt trained over said motor pulley and said drive groove in said sharpening wheel.

35. The combination defined in claim 32 further characterized by said sharpener wheel being conical in shape with a diameter at its upper end smaller than the diameter at its lower end.

36. The combination defined in claim 32 further characterized by said sharpener wheel being cylindrical in shape and said third substantially vertical axis being tilted relative to said first vertical axis.

37. In a cutter head for cutting sheet material, the combination comprising:
a frame,
a vertically elongated knife having a lower portion and an upper leaf spring portion with an upper end and also having two opposite side faces, said front and rear edges, said front and rear edges defining a knife width dimension and said opposite said faces defining a knife thickness,
a knife guide carried by said knife frame supporting said lower portion of said knife for reciprocation relative to said frame along a vertical axis, said leaf spring portion of said knife along at least part of its length having a tapered thickness such that said upper end portion of said knife is deflectable laterally away from said vertical axis to a given position by a substantially smaller force than would be required to achieve the same deflection in the absence of said tapered thickness, and
a reciprocating mechanism carried by said frame and located above said knife guide means and connected with said upper end of said leaf spring portion for reciprocating said knife,
said reciprocating mechanism including an eccentric member connected to said upper end of said leaf spring portion so that during each cycle of reciprocation said upper end of said leaf spring portion is laterally deflected to one side and then the other of said vertical axis, said guide means having a plurality of pairs of rollers located at different vertical levels relative to said vertical axis for engaging said side faces of said knife along said lower portion thereof to laterally restrain said knife to said vertical axis at said vertical levels.

38. The combination defined in claim 37 further characterized by said lower portion of said knife including said having forward and rear edges, said guide means including at least one pair of rollers engaging said front and rear edges to restrain said knife against forward and rearward displacement from said vertical axis.

39. The combination defined in claim 37 further characterized by said leaf spring portion of said knife along at least a part of its length being tapered so that the thickness of said leaf spring portion decreases in proceeding upwardly toward its upper end.

40. In a cutter head for use as part of a machine for cutting sheet material, the combination comprising:
- a base frame,
- a tool carriage movable in two coordinate directions relative to the surface of a piece of sheet material to be cut,
- means mounting said base frame to said tool carriage for movement relative to said tool carriage solely in a vertical direction between a lowered cutting position and a raised noncutting position and preventing rotation of said base frame relative to said tool carriage about any vertical axis,
- a knife frame carried by said base frame and rotatable relative to said base frame about a vertical axis fixed relative to said base frame,
- a vertically elongated knife having a lower portion and an upper leaf spring portion with an upper end and also having two opposite side faces and forward and rear edges, said two opposite side faces defining a knife dimension thickness and said forward and rear edges defining a knife width dimension,
- knife guide means carried by said knife frame supporting said lower portion of said knife for reciprocation relative to said knife frame along said vertical axis and for movement with said knife frame about said vertical axis, said guide means having a plurality of pairs of rollers located at different vertical levels relative to said vertical axis for engaging said side faces of said knife along said lower portion thereof to laterally restrain said knife to said vertical axis at said vertical levels, said guide means also including at least one pair of rollers engaging said front and rear edges of said knife to restrain said knife against forward and rearward displacement from said vertical axis,
- a knife reciprocating mechanism carried by said knife frame and including an input shaft rotatable about a horizontal axis fixed relative to said knife frame and intersecting said vertical axis, said reciprocating mechanism also including an eccentric member fixed relative to said input shaft and spaced radially from said axis of said input shaft, and a chuck pivotally connected to said eccentric member for grasping the upper end of said knife,
- a knife drive motor fixed to said base frame and having a rotatable output shaft aligned with said vertical axis,
- a drive means drivingly connecting said output shaft of said knife drive motor to said input shaft of said knife reciprocating mechanism while permitting said knife frame and said knife reciprocating mechanism to rotate about said vertical axis independently of said knife motor, said drive means including a first pulley on said output shaft of said knife drive motor, a second pulley on said input shaft of said knife reciprocating mechanism and third and fourth idler pulleys, said third and fourth idler pulleys being located on a common axis perpendicular to the plane containing said vertical axis and said axis of said reciprocating mechanism input shaft and being located on opposite sides of said plane, and a drive belt passing around said first, second, third and fourth pulleys to transmit the rotation of said motor output shaft to said reciprocating mechanism input shaft while permitting said knife frame to rotate relative to said base frame about said vertical axis,
- a bearing between said knife frame and said output shaft of said knife drive motor for rotatably supporting said knife frame from said output shaft for rotation about said vertical axis,
- said leaf spring portion of said knife having a tapered thickness along at least a part of the length thereof, said tapering of the thickness of said leaf spring protion along part of the length thereof being such that said thickness decreases in proceeding away from said knife guide means,
- a pair of rollers located on opposite sides of said leaf spring portion of said knife between said knife guide means and said reciprocating mechanism and carried by said knife frame, said pair of rollers being so spaced from one another and from said vertical axis in the direction laterally of said leaf spring portion of said knife that each of said rollers engages said leaf spring portion of said knife during only a small portion of each cycle of reciprocation of said knife to inhibit the development of large aptitudes of vibration in said leaf spring portion, and
- a sharpener mechanism including a sharpener arm pivotally connected to said tool carriage for movement about a first axis parallel to said vertical axis, a sharpening wheel rotatably mounted on said sharpening arm for rotation relative to said arm about a second axis parallel to said vertical axis, said sharpener arm being movable about said first axis between a retracted position at which said sharpening wheel is spaced from said vertical axis and a sharpening position at which said sharpening wheel is positioned adjacent said vertical axis to engage said knife when said base frame is in said noncutting position, means urging said sharpener arm toward said retracted position, an actuator for moving said arm from said retracted position to said sharpening position against the force of said urging means, said sharpener wheel comprising a body of revolution with a drive belt groove located intermediate its ends and having grit bonded to its outer surface, a motor carried by said tool carriage and having an output shaft with a pulley, and a drive belt trained over said motor pulley and said drive groove in said sharpening wheel for rotatably driving said sharpening wheel about said second axis,
- said knife being rotatable about said first vertical axis as a result of rotation of said knife frame relative to said base frame to allow said sharpener wheel to engage and sharpen either one of said two side faces of said knife.

* * * * *